US006473836B1

(12) United States Patent
Ikeda

(10) Patent No.: US 6,473,836 B1
(45) Date of Patent: Oct. 29, 2002

(54) COMPUTING SYSTEM AND CACHE MEMORY CONTROL APPARATUS CONTROLLING PREFETCH IN HIERARCHICAL CACHE MEMORIES

(75) Inventor: Masayuki Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/513,854

(22) Filed: Feb. 25, 2000

(30) Foreign Application Priority Data

May 27, 1999 (JP) ............................................ 11-147500

(51) Int. Cl.[7] .............................................. G06F 13/00
(52) U.S. Cl. ....................................... 711/137; 711/122
(58) Field of Search ................................... 711/122, 137

(56) References Cited

U.S. PATENT DOCUMENTS

| 5,619,674 A | | 4/1997 | Ikumi ........................ 711/131 |
| 5,829,025 A | * | 10/1998 | Mittal ........................ 711/122 |
| 5,956,746 A | * | 9/1999 | Wang ......................... 711/137 |
| 6,026,470 A | * | 2/2000 | Arimilli et al. .............. 711/128 |
| 6,131,145 A | * | 10/2000 | Matsubara et al. ......... 711/137 |
| 6,138,209 A | * | 10/2000 | Krolak et al. ............... 711/128 |

FOREIGN PATENT DOCUMENTS

| JP | HEI 4-85788 | | 3/1992 |
| JP | HEI 5-257807 | | 10/1993 |
| JP | HEI 6-110779 | | 4/1994 |
| JP | 9-128293 | * | 5/1997 |
| JP | HEI 9-160828 | | 6/1997 |

* cited by examiner

Primary Examiner—Glenn Gossage
(74) Attorney, Agent, or Firm—Staas & Halsey LLP

(57) ABSTRACT

A cache memory control apparatus provided to prevent necessary data from being ejected from hierarchical cache memories and to avoid conflicts of process in the main pipeline of a processing unit (arithmetic unit), even when prefetch commands are issued at high frequency. The apparatus includes a command control section to issue a prefetch command instruction that speculative data is to be fetched (prefetched) from a main storage unit into a plurality of hierarchically arranged cache memories, and a prefetch control section to changeably select at least one of the hierarchically arranged cache memories as a destination to receive prefetch data when the prefetch command issued from the command control section is executed, according to at least one of status information of one of the cache memories and a type or kind of prefetch. The apparatus is particularly useful when applied to a computer system of the type having a prefetch operation.

26 Claims, 4 Drawing Sheets

FIG.2

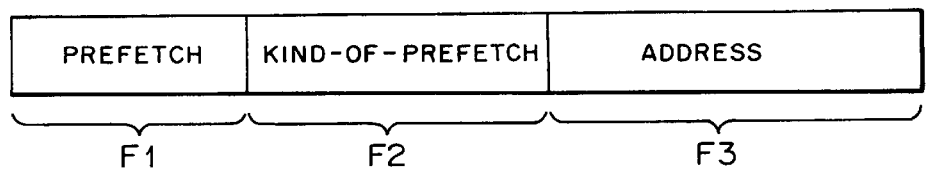

FIG.3

| KIND-OF-PREFETCH (CODE) | PREFETCH-DESTINATION CHANGE-OVER CONTROL CONDITION (MEANING OF CODE) |
|---|---|
| 000 | PREFETCH DATA INTO BOTH PRIMARY AND SECONDARY CACHE MEMORIES. |
| 001 | PREFETCH DATA INTO AT LEAST SECONDARY CACHE MEMORY; IF ADEQUATE PART OF ACCESS PORTS OF PRIMARY CACHE MEMORY IS FOUND VOID OF DATA, PREFETCH DATA INTO PRIMARY CACHE MEMORY ALSO. |
| 010 | PREFETCH DATA INTO AT LEAST SECONDARY CACHE MEMORY; IF THE DATA STORED IN PRIMARY CACHE MEMORY WILL NOT BE EJECTED, PREFETCH DATA INTO PRIMARY CACHE MEMORY ALSO. |
| 011 | PREFETCH DATA INTO AT LEAST SECONDARY CACHE MEMORY; IF ADEQUATE PART OF ACCESS PORTS OF PRIMARY CACHE MEMORY IS FOUND VOID OF DATA AND IF DATA STORED IN PRIMARY CACHE MEMORY WILL NOT BE EJECTED, PREFETCH DATA INTO PRIMARY CACHE MEMORY ALSO. |
| 100 | PREFETCH DATA INTO PRIMARY CACHE MEMORY BUT NOT INTO SECONDARY CACHE MEMORY. |

COMPUTING SYSTEM AND CACHE MEMORY CONTROL APPARATUS CONTROLLING PREFETCH IN HIERARCHICAL CACHE MEMORIES

BACKGROUND OF THE INVENTION

1. Field of the Invention

The present invention relates generally to a cache memory control apparatus for controlling hierarchical cache memories disposed between a main storage unit and a processing unit, which executes various processes using data stored in the main storage unit, and a computer system equipped with the cache memory control apparatus. More particularly, the invention is directed to a cache memory control apparatus for use in a computer system having a prefetch function of fetching speculative data, which is inclined to become necessary in the processing unit, from the main storage unit into the hierarchical cache memories in advance, and also directed to a computer system equipped with the cache memory control apparatus.

2. Description of the Related Art

A conventional computer system (data processing machine), as shown in FIG. 5 of the accompanying drawings, generally comprises a main storage unit (hereinafter called MSU) 12 storing programs and various data to be processed by the programs, and a central processing unit (hereinafter called CPU) 11 for executing various processes using the data stored in the MSU 12.

Recently, with increasing improvement of throughput of the CPU 11 and increasing enlargement of capacity of the MSU 12 as well, the data processing speed in the CPU 11 has been much faster as compared to the speed of access to the MSU 12. Assuming that the CPU 11 and the MSU 12 are combined and are respectively regarded as the data consumption side and the data supply side, shortage of supply of data tends to occur so that the CPU 11 would spend most of the processing time waiting for data from the MSU 12, lowering the effective throughput of the CPU 11 even though its processing speed is increased.

As a solution, it has been customary to minimize the apparent access time of the MSU 12, as viewed from the CPU 11, by placing a cache memory, which is smaller in capacity and higher in processing speed than the MSU 12, either inside or outside an operationally near the CPU 11 and by using the cache memory to adjust the access delay of the MSU 12 with respect to the cycle time of the CPU 11.

This cache memory usually assumes only a single level or class (of the hierarchy), in the form of a block of plural words, between the MSU 12 and a register 11$b$ in the CPU 12. Alternatively, however, if the difference between the access time of the MSU 12 and the cycle time of the CPU 11 is considerably large, one or more additional levels or classes (blocks of plural words) are placed between the MSU 12 and the register 11$b$ in the CPU 11. In the example shown in FIG. 5, a primary cache memory 13 and a secondary cache memory 14 are placed between the MSU 12 and the register 11$b$, which is coupled to an arithmetic unit 11$a$, in the CPU 11 to form a two-level or a two-class cache memory hierarchy. Both the primary and secondary cache memories 13, 14 are disposed inside the CPU 11.

Specifically the primary cache memory 13 is disposed hierarchically near the arithmetic unit 11$a$ while the secondary memory 14 is disposed hierarchically near the MSU 12. Generally the secondary cache memory 14 is set to be larger in storage capacity than the primary cache memory 13; that is, in a multi-cache-memory hierarchy, the nearer a cache memory is disposed with respect to the arithmetic unit 11$a$, the smaller its storage capacity should be set.

In the computer system equipped with the foregoing cache memories 13, 14 with the two-level or two-class hierarchy, if the CPU 11 needs a certain kind of data D, first the CPU 11 discriminates whether the data D is stored in the primary cache memory 13. If the same data D is stored in the primary cache memory 13 (if a "cache hit" results with respect to the primary cache memory 13), the CPU 11 reads the data D from the primary cache memory 13 without having to access either the secondary cache memory 14 or the MSU 12.

On the contrary, if the data D is not stored in the primary cache memory 13 (if a "cache miss" results with respect to the primary cache memory 13), the CPU 11 discriminates whether the data D is stored in the secondary cache memory 14. As a result, if a cache hit then results with respect to the secondary cache memory 14 (if information retrieval has taken place successfully with respect to the secondary cache memory 14), the CPU 11 reads a data block containing the data D from the secondary cache memory 14 and then writes the data block into the primary cache memory 13, whereupon the CPU 11 reads the data D from the primary cache memory 13.

Further, if the data D is not stored even in the secondary cache memory 14 (if a cache miss results with respect to the secondary cache memory 14), the CPU 11 reads a data block containing the data D from the MSU 12 and writes the data block into the primary and secondary cache memories 13, 14, whereupon the CPU 11 reads the data D from the primary cache memory 13.

As mentioned above, if a cache miss has resulted with respect to the primary cache memory 13 or the secondary cache memory 14, the data D must be read from the secondary cache memory 14 or the MSU 12, respectively, which would take more time to read the data D. In the meantime, although recent computer systems have sharply increased the clock frequency of the CPU 11, the performance of MSU 12, such as in the form of DRAM (dynamic random access memory), has not kept up with the improvement in the increased throughput of the CPU 11. As a result, the MSU 12 would be located far from CPU 11 since as previously mentioned that the difference between the access time of the MSU 12 and the cycle time of the CPU 11 is considerably large the throughput of the CPU 11 would increasingly be impaired due to the foregoing unsuccessful accessing of the cache memories 13 ending.

In order to avoid the penalty for unsuccessful access of the cache memories 13 and 14, it has been a common practice to fetch necessary data from the MSU 12 into the cache memories 13, 14 prior to the arithmetic processing.

For this purpose, the CPU 11 issues, in addition to a loading command to fetch data from the MSU 12 into the register 11$b$, a dedicated-to-loading command to fetch the data from the MSU 12 into the primary and secondary cache memories 13, 14, but not into the register 11$b$, whereupon the CPU 11 can execute a separate process (the arithmetic process in the illustrated example) without managing or monitoring the state of execution of the dedicated-to-loading command, thus leaving a process or processes associated with the dedicated-to-loading command to the primary and secondary cache memories 13, 14. This dedicated-to-loading command is also called a "prefetch" command because of its function.

Now assuming that the arithmetic unit 11a performs consecutive arithmetic processes as data of the first to N-th items are substituted for concerned items of a predetermined equation one item in each arithmetic process, the CPU 11 issues a prefetch command to fetch (i+k)th item data to the primary cache memory 13, prior to execution of the arithmetic process with respect to i-th item data, thereby resulting in the arithmetic unit 11a executing the respective arithmetic process without a cache miss.

As a result, the (i+k)th item data, which is inclined to become necessary in a forthcoming arithmetic process succeeding the arithmetic process of the i-th item data (by the arithmetic unit 11a) by k steps, is fetched into the primary and secondary cache memories 13, 14 in parallel to the arithmetic process of the i-th item data. Therefore, by the time the CPU 11 should fetch the (i+k)th item data from the primary cache memory 13 into the register 11b for the arithmetic process coming k steps later, the (i+k)th item data will have existed in the primary cache memory 13 so that a cache miss can be prevented, thus avoiding any penalty for the cache miss.

However, the following problems have been encountered with the conventional technology if such a prefetch command is issued repeatedly in order to surely avoid penalties for possible cache misses:

(1) If the throughput (frequency of occurrence) of prefetch commands rises, a particular prefetch command for the data of a certain item would be issued much earlier than necessary, so that the data of the certain item would be fetched into the primary cache memory 13 too early. Because the primary cache memory 13 has usually only a limited storage capacity, the existing data could be ejected from the primary cache memory 13 as additional data is stored into the primary cache memory 13 from the MSU 12 in response to the execution of another prefetch command issued later. In that event, the prefetched data does not exist in the primary cache memory 13 when it actually becomes necessary for the forthcoming arithmetic process to be performed by the arithmetic unit 11a, which would result in cache miss with respect to the primary cache memory 13. Consequently that data must be prefetched again from the secondary cache memory 14 or the MSU 12 into the primary cache memory 13, which would in turn reduce the throughput of the CPU 11.

(2) The primary cache memory 13 must be the one which the arithmetic unit 11a can have high-speed access. For this purpose, not only the storage capacity of the primary cache memory 13 but also the number of ports, at which simultaneous accessing is allowable, in the primary cache memory 13 are restricted so that, if the throughput (frequency of issue) of prefetch commands could be increased, the storing of data from the primary cache memory 13 into the register 11b and from the secondary cache memory 14 into the primary cache memory 13 would be delayed due to the execution of the prefetch commands. In other words, in the main pipeline of the CPU 11, the access to the primary cache memory 13 which access will be inclined to become necessary in the ordinary process would collide with the access to the primary cache memory 13 for execution of the prefetch command, lowering the throughput of the CPU 11.

SUMMARY OF THE INVENTION

With the foregoing problems in view, it is an object of the present invention to provide a cache memory control apparatus and a computer system which prevent ejection of necessary data from a cache memory confliction in the main pipeline of a processing unit, guaranteeing high-speed processing of the computer system even if the prefetch commands are issued at high frequency.

In order to accomplish the above-mentioned object, according to a first aspect of the present invention, there is provided a cache memory control apparatus for controlling a plurality of hierarchically arranged cache memories into which data of high-frequency of access by a processing unit, which executes various processes using data stored in a main storage unit, the apparatus comprising: a command control section for issuing a prefetch command instruction to fetch speculative data, which is inclined to become necessary for near future use in the processing unit, from the main storage unit into the cache memories, prior to execution of the individual process by the processing unit and a prefetch control section for controlling the hierarchically arranged cache memories, when the prefetch command issued by the command control section is executed, in such a manner that at least one of the hierarchically arranged cache memories, to which the speculative data which is inclined to become necessary for near future use in the processing unit is to be fetched, which is inclined to be is changeably selected as one or more destination cache memories.

According to a second aspect of the present invention, a computer system comprises: a main storage unit, a processing unit for executing various processes using data stored in the main storage unit, a plurality of hierarchically arranged cache memories to which data of high-frequency of access by the processing unit is to be fetched from the main storage unit and a cache memory control apparatus for controlling the plurality of hierarchically arranged cache memories. The cache memory control apparatus includes a command control section for issuing a prefetch command instruction to fetch speculative data, which is inclined to become necessary for near future use in the processing unit, from the main storage unit into the cache memories prior to execution of the individual process by the processing unit, and a prefetch control section for controlling the cache memories, when the prefetch command issued by the command control section is executed, in such a manner that at least one of the cache memories to which the speculative data is to be fetched is changeably selected as one or more destination cache memories.

Preferably, the cache memory control apparatus also comprises a status information detecting means for detecting status information about one of the cache memories disposed operationally near the processing unit and outputting the detected status information to the prefetch control section so that the prefetch control section controls the cache memories so as to change over the one or more destination cache memories in accordance with the detected status information.

The command control section of the cache memory control apparatus preferably includes; a prefetch kind setting section for setting kind-of-prefetch information about the kind of prefetch as a prefetch-destination change over control condition (i.e., the change-over control condition for prefetching data to the primary and/or secondary caches) for the prefetch command to be issued by the command control section; and a prefetch kind identifying section for identifying the kind of prefetch set for the prefetch command and outputting the result of the identification of the kind of prefetch to the prefetch control section so that the prefetch control section controls the changeover of the destination cache memory based on the kind of prefetch received from the prefetch kind identifying section.

In the above-mentioned cache memory control apparatus and computer system of the present invention, the prefetch control section changeably selects one or more destination cache memories among the plural hierarchical cache memories in accordance with the status information about one hierarchical cache memory hierarchically near the processing unit (state-of-use information about the storage area or state-of-contention information about the ports), when a prefetch command is executed.

Namely, when a prefetch command is executed, the data prefetched from the main storage unit is not always stored in all of the hierarchical cache memories but is copied into only appropriate cache memories in accordance with the status information about one hierarchical cache memory hierarchically near the processing unit.

Accordingly, it is possible to restrict access (prefetch) to the cache memory hierarchically near the processing unit (the primary cache memory) in accordance with the status of the primary cache memory. And particularly if the prefetch commands are issued at high frequency, it is possible to avoid ejecting or replacing (sweeping) necessary data from the cache memory and incurring a conflict in the main pipeline of the processing unit, realizing high-speed processing in the computer system.

BRIEF DESCRIPTION OF THE DRAWINGS

FIG. 2 is a diagram schematically showing the format of a prefetch command to be used in one embodiment of the present invention;

FIG. 3 is a table illustrating various prefetches in code to be used in one embodiment of the present invention;

DESCRIPTION OF THE PREFERRED EMBODIMENT

Throughout this specification, the term "prefetch" means to store or copy a speculative part of data of a main storage unit or the like into or onto a cache memory prior to execution of an arithmetic process. The term "cache miss" means the absence of speculative data in a destination cache memory due to the unsuccessful execution of a prefetch command and the term "cache hit" means the presence of speculative data in a destination cache memory as the result of the successful execution of a prefetch command.

One preferred embodiment of the present invention will now be described in detail with reference to the accompanying drawings.

Figure 1:
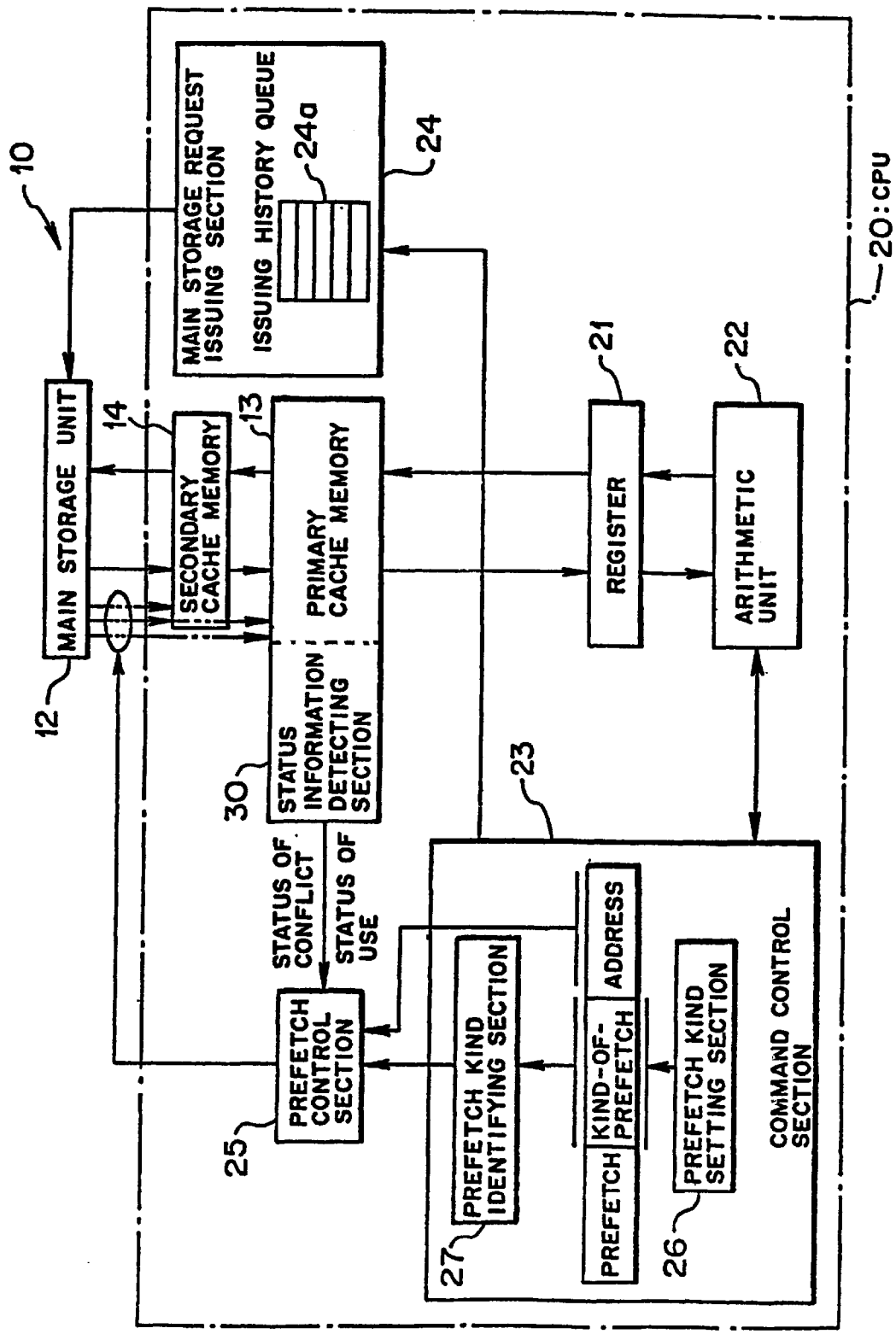
FIG. 1 is a block diagram schematically showing a computer system having a cache memory control apparatus according to one embodiment of the present invention.
Figure 5:
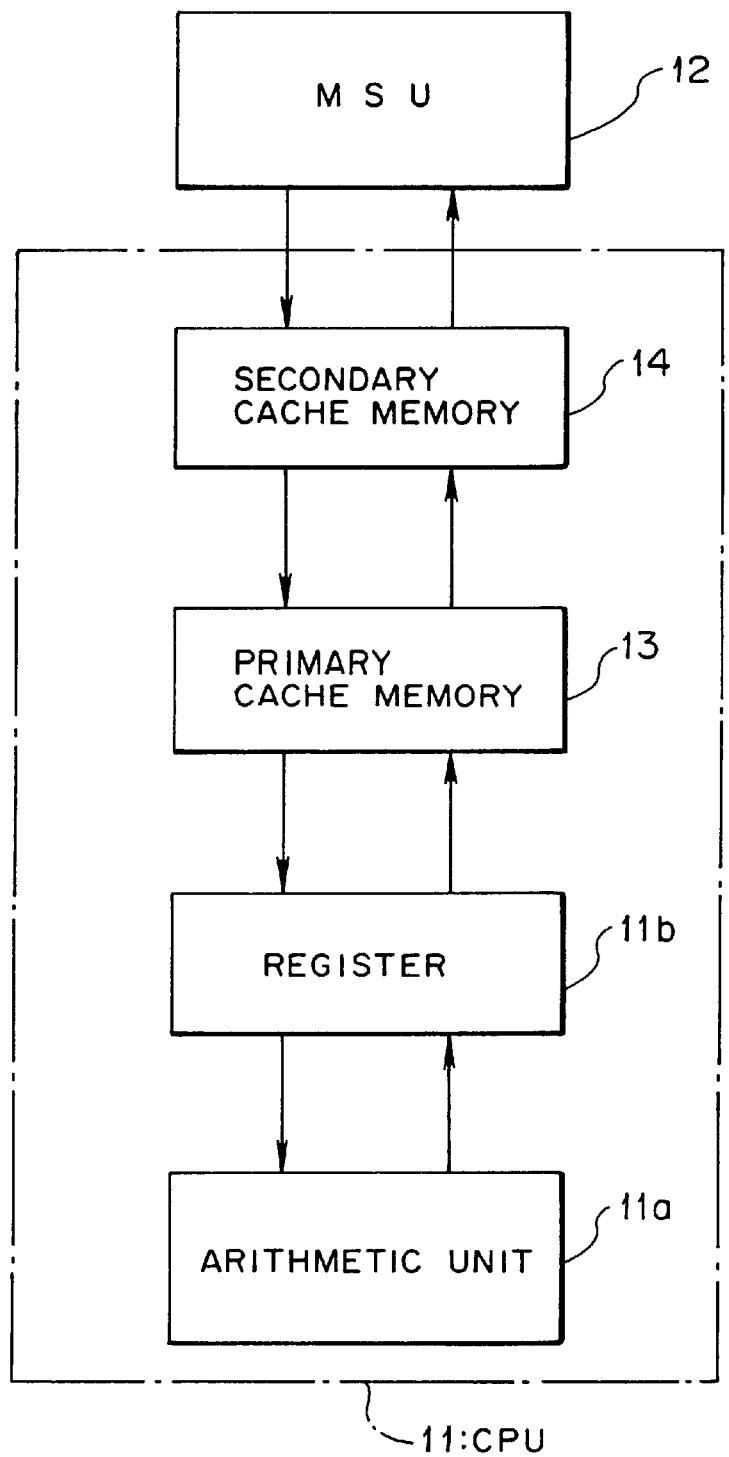
FIG. 5 is a block diagram schematically showing a conventional computer system having two cache memories hierarchically arranged.

FIG. 1 is a block diagram schematically showing a computer system having a cache memory control apparatus according to one embodiment of the present invention. The computer system 10, like the conventional computer system shown in FIG. 5, as shown in FIG. 1, basically comprises a main storage unit (hereinafter called MSU) 12 and a central processing unit (hereinafter called CPU) 20.

The MSU 12 stores programs and various items of data to be processed by the programs and, in the meantime, the CPU 20 executes various processes using data stored in the MSU 12. The CPU 20 comprises two cache memories hierarchically arranged (a primary cache memory 13 and a secondary cache memory 14), a register 21, an arithmetic unit (processing section) 22, a command control section 23, a main storage request issuing section 24 and a prefetch control section 25. The primary cache memory 13 includes a status information detecting section 30.

The cache memory control apparatus comprises the command control section 23, the prefetch control section 25 and the status information detecting section 30 of the primary cache memory 13 (jointly), which together constitute the cache memory control apparatus, for the purpose of controlling the hierarchically arranged primary and secondary cache memories 13 and 14.

In the CPU 20, the primary and secondary cache memories 13 and 14 are arranged between the MSU 12 and the register 21, and speculative data of high-frequency access by the CPU 20 (for example by the arithmetic unit 22) is copied from the MSU 12. The primary cache memory 13 and secondary cache memory 14 are disposed hierarchically near the arithmetic unit 22 and the MSU 12, respectively. In general, the storage capacity of the secondary cache memory 14 is larger than that of the primary cache memory 13.

The register 21 temporarily stores data (operand) to become necessary for arithmetic process (operation) in the arithmetic unit 22, and also stores the result of the arithmetic process by the arithmetic unit 22 which result is to be rewritten into the cache memories 13, 14 and the MSU 12. The arithmetic unit (processing section) 22 executes the arithmetic process based on the data stored in the register 21 and writes the result of the process into the register 21.

The command control section 23 controls the issuing of various prefetch commands in accordance with processes of the CPU 20 (the arithmetic processes of the arithmetic unit 22). Assuming that the speculative data necessary for process in the arithmetic unit 22 does not exist in either one of the primary and secondary cache memories 13, 14, namely, in the presence of a cache miss, the command control section 23 issues to the MSU 12 a load command instruction to store the speculative data, which produced the cache miss into the cache memories 13, 14 and the register 21, and issues a prefetch command instruction to store additional speculative data, which is inclined to become necessary in the arithmetic unit 22, into the cache memories 13, 14 from the MSU 12 in advance.

The command control section 23 includes a prefetch kind setting section 26 and a prefetch kind identifying section 27. The prefetch kind setting section 26 sets, for each prefetch command, kind-of-prefetch information used as a changeover condition of the destination cache memory in the prefetch control section 25, and the prefetch kind identifying section 27 identifies the kind of prefetch set for the individual prefetch command and outputs such prefetch command to the prefetch control section 25.

The main storage request issuing section 24 receives commands including one or more prefetch commands issued from the command control section 23 and issues requests to the MSU 12 in the command issuing order. The main storage request issuing section 24 includes an issuing history queue 24a which holds commands issued from the command control section 23 (in fact, the main storage space address of the to-be-accessed data in accordance with the commands is held in the history queue 24a) in the command issuing order.

The status information detecting section 30 automatically detects, as status information of the primary cache memory 13, state-of-use information of a storage area in the primary cache memory 13 (in-use information) and status-of-contention information of access ports of the primary cache memory 13 (conflict information). The status information detecting section 30 then outputs the detected status information to the prefetch control section 25. Further, the status information detecting section 30 also detects the in-use information of the primary cache memory 13, specifically information as to whether the prospective prefetched data read from the MSU 12 can be stored into the primary cache memory 13 without ejecting the existing data in the primary cache memory 13.

The prefetch control section 25 changeably selects one destination cache memory from the two hierarchical cache memories 13, 14 in accordance with both the status information of the primary cache memory 13 which information has been detected by the status information detecting section 30 and the kind of prefetch identified by the prefetch kind identifying section 27, when the prefetch command issued from the command control section 23 is executed.

The format of a prefetch command used in the illustrated embodiment will now be described using FIG. 2. In general, a command issued from the command control section 23 has a field F1 for storing an operation code (a command code), a field F2 for storing an extended operation code or operand designation information, and a field F3 for storing a desired main storage space address of the data to be accessed according to the operation code.

In the illustrated embodiment, as shown in FIG. 2, when a prefetch command is issued from the command control section 23, a code "prefetch" designating the prefetch command is set in the field F1, and a main storage space address (an address in the MSU 12) of the speculative data block to be accessed (prefetched) according to the prefetch command is set in the field F3. And, a code "kind-of-prefetch" designating the kind of prefetch is set in the field P2 by the function of the prefetch kind setting section 26.

The codes designating the kind of prefetch (kind-of-prefetch) a reassigned in 3-bit data, for example, shown in FIG. 3. When the prefetch command whose kind has been set is executed, the kind of prefetch designated by the code is used as a changeover condition of the destination cache memory in the prefetch control section 25. In the illustrated example in which the CPU 20 has the two cache memories 13, 14 hierarchically arranged, there are assigned the following five kind-of-prefetch codes as shown in FIG. 3.

① When one kind-of-prefetch code "000" is executed, the prefetch control section 25 performs a prefetch control such that data is prefetched from the MSU 12 into both the primary cache memory 13 and the secondary cache memory 14, irrespective of the status information of the primary cache memory 13 which information has been detected by the status information detecting section 30.

② When another kind-of-prefetch code "001" is executed, the prefetch control section 25 performs an alternative prefetch control such that data is prefetched from the MSU 12 into the secondary cache memory 14. And if an adequate part of the access ports of the primary cache memory 13 is found void of data determined by consultation with the conflict information detected by the status information detecting section 30, the prefetch control section 25 performs another alternative prefetch control such that data is prefetched from MSU 12 into the primary cache memory via the free access port.

③ When still another kind-of-prefetch code "010" is executed, the prefetch control section 25 performs still another alternative prefetch control such that data is prefetched from the MSU 12 into the secondary cache memory 14. If data stored in the primary cache memory 13 will not be ejected (replaced) from the primary cache memory 13 determined by consultation with the in-use information by the status information detecting section 30, the prefetch control section 25 performs a further alternative prefetch control such that data is prefetched from the MSU 12 into the primary cache memory 13.

④ When a further kind-of-prefetch code "011" is executed, the prefetch control section 25 performs another alternative prefetch control such that data is prefetched from the MSU 12 into secondary cache memory 14. If data stored in primary cache memory 13 will not be ejected (replaced) from the primary cache memory 13 determined by consultation with the in-use information by the status information detecting section 30 and also if adequate part of access ports of the primary cache memory 13 is found void of data determined by consultation with the conflict information detected by the status information detecting section 30, the prefetch control section 25 performs still another alternative prefetch control such that data is prefetched from the MSU 12 into the primary cache memory via the free access port.

⑤ When a still further kind-of-prefetch code "100" is executed, the prefetch control section performs further prefetch control such that data is prefetched from the MSU 12 into the primary cache memory 13 and is prevented from being stored into the secondary cache memory 14, irrespective of the status information of the primary cache memory 13 detected by the status information detecting section 30.

In the meantime, the main storage request issuing section 24 in the CPU 20 includes the above-mentioned issuing history queue 24a for issuing a multiplicity of main storage requests in succession, including requests responsive to prefetch commands and requests responsive to cache misses. Assuming that the history queue is of a forty-stage form, the issuing history queue 24a can store forty commands (addresses).

Figure 4:
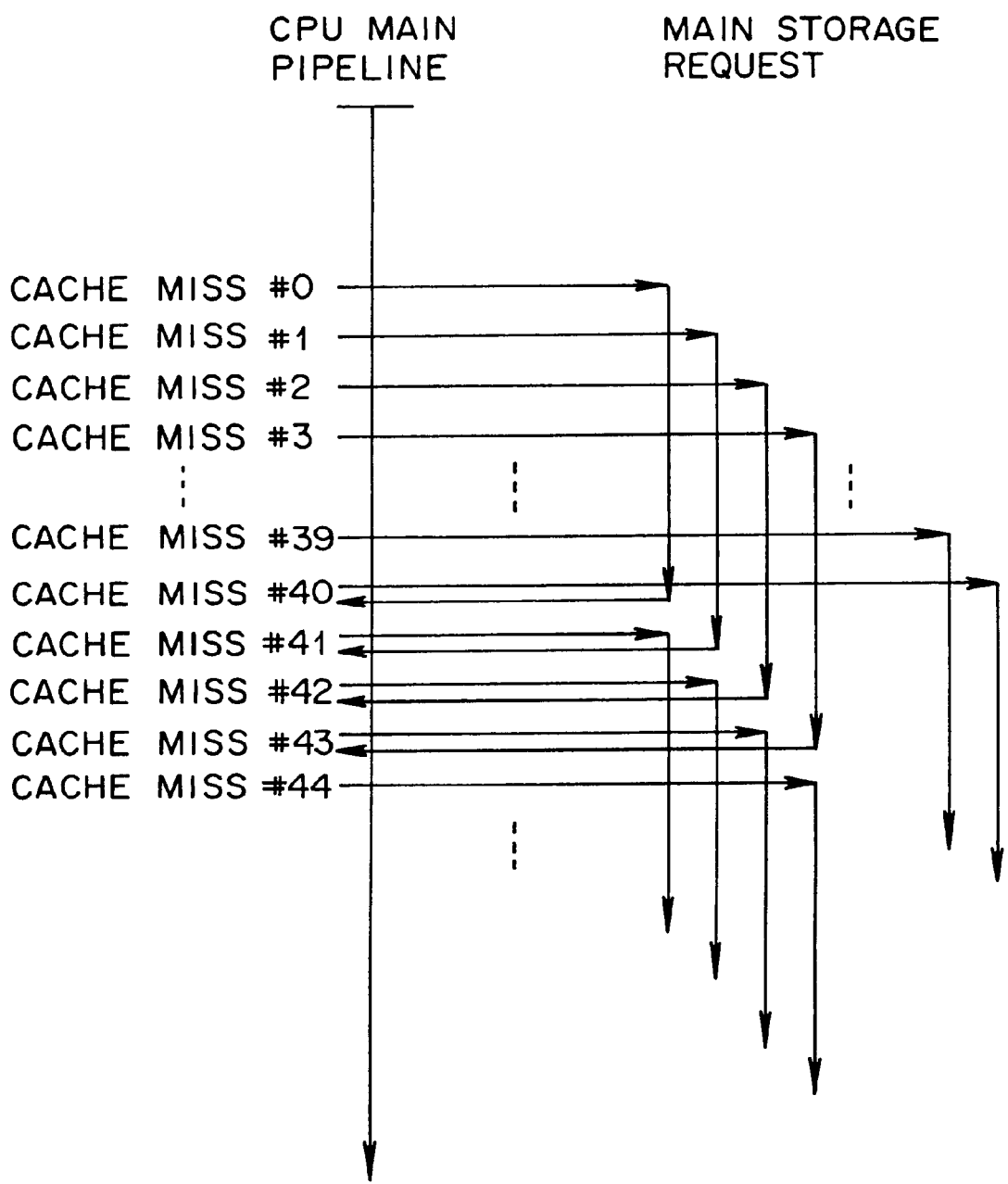
FIG. 4 is a diagram illustrating the manner in which main storage requests are issued in the one embodiment of the present invention.

Accordingly, as shown in FIG. 4, the CPU 20 can execute forty commands including one or more prefetch commands concurrently (in parallel with the corresponding arithmetic processes in the arithmetic unit 22).

Further, the cache memories 13, 14 in the computer system 10 are provided with a sufficient number of read/write ports (I/O ports and access ports) so as not to cause a conflict even if loads/prefetches from the MSU 12 into the primary and secondary cache memories 13, 14 and those from the primary cache memory 13 into register 21 are concurrently executed. For example, each of the cache memories 13, 14 is in the form of a multi-port RAM.

The operation of the computer system 10 having the cache memory control apparatus of this embodiment will be now described.

First of all, the CPU 20 reads a program stored in the MSU 12 and executes an arithmetic process using the data read out from the MSU 12 and then writes the result of the arithmetic process into the MSU 12.

In general, object data to be processed in the arithmetic unit 22 is read from the MSU 12 by issuing a load command or a prefetch command, which are issued by the command control section 23, to the MSU 12 via the main storage command issuing section 24 and is thereby stored in the two-level or two-class cache memories 13, 14 and the register 21. Subsequently, the data read from the register 21 by execution of the arithmetic command is supplied to the arithmetic unit 22 and is processed therein. The result of the process by the arithmetic unit 22 is stored in the register 21 whereupon the same result is stored from the register 21 into the two cache memories 13, 14 and the MSU 12 by execution of a store command issued at a suitable timing.

In the computer system 10 of the illustrated embodiment, when a prefetch command issued by the command control section 23 is executed, the prefetch control section 25 changes over the destination cache memory between the primary and secondary cache memories 13, 14, as described hereinbelow, based on the in-use information and the conflict information detected by the status information detecting section 30 and the kind of prefetch identified by the prefetch kind identifying section 27.

When the second-named kind-of-prefetch code "001" is set, data from the MSU 12 is prefetched into the secondary cache memory 14; and if adequate part of access ports of primary cache memory 13 is found void of data, data from MSU 12 is also prefetched into primary cache memory 13 via the free access port. Accordingly, if adequate part of access ports of the primary cache memory 13 is found not void of data, data from MSU 12 is prefetched into only the secondary cache memory 14.

When the third-named kind-of-prefetch code "010" is set, data from the MSU 12 is prefetched into the secondary cache memory 14; and if data stored in the primary cache memory 13 will not be ejected from the primary cache memory 13 in execution of prefetch, data from the MSU 12 is also prefetched into the primary cache memory 13. Otherwise if data stored in the primary cache memory 13 will be ejected from the primary cache memory in executing prefetch, the data from the MSU 12 is prefetched into only the secondary cache memory 14.

When the forth-named kind-of-prefetch code "011" is set, the data from the MSU 12 is prefetched into the secondary cache memory 14; and if data stored in primary cache memory 13 will not be ejected from primary cache memory 13 in execution of prefetch and also if adequate part of access ports of the primary cache memory 13 is found void of data, data from the MSU 12 is also prefetched into the primary cache memory 13 via the free access port. Accordingly, if adequate part of access ports of the primary cache memory 13 is found not void of data, or if the data stored in the primary cache memory 13 will be ejected from the primary cache memory 13 in executing of prefetch, or if adequate part of access ports of the primary cache memory 13 is found not void of data and the data stored in primary cache memory 13 will be ejected from primary cache memory 13 in executing prefetch, the data from the MSU 12 is prefetched into only the secondary cache memory 14.

When the first-named kind-of-prefetch code "000" is set, the data from the MSU 12 is always prefetched into both the primary cache memory 13 and secondary cache memory 14, irrespective of the status information of primary cache memory 13. When the fifth-named kind-of-prefetch code "100" is set, the data from the MSU 12 is always prefetched into only the primary cache memory 13, irrespective of the status information of primary cache memory 13.

According to this preferred embodiment, when a prefetch command is executed, the data stored from MSU 12 is not always prefetched into both the primary and secondary cache memories 13, 14; this is, the destination of prefetch is selected between both the primary and secondary cache memories 13, 14, or only the primary cache memory 13, or only the secondary cache memory 14 based on the in-use information and conflict information of the primary cache memory 13.

Therefore prefetching data from the MSU 12 into the primary cache memory 13 is restricted based on the status of the primary cache memory 13; if prefetch commands are issued at high frequency, high-speed processing in the computer system 10 is possible because ejection of necessary data from the primary cache memory 13 and occurrence of a conflict in the main pipeline of the CPU 20 are prevented.

If capacity of the primary cache memory 13 is particularly small, it is possible to prevent over-ejection of data from the primary cache memory 13 because ejection of data from the primary cache memory 13 is restricted.

Further, since selection of kind of access of prefetch (kind-of-prefetch) is controlled by a program and/or hardware (prefetch kind setting section 26 in the illustrated embodiment), it is possible to abate the load of the primary cache memory 13, thus improving the effective performance of the CPU 20 (the computer system 10) drastically.

In the computer system 10 of the present invention, when cache misses are detected successively in CPU 20, not only the main storage request corresponding to the cache misses but also those corresponding to a multiplicity of prefetch commands can be issued in succession.

Assuming that a cache-miss penalty (time required for reading the desired data into the register from the MSU 12 after the CPU 20 detects a cache miss) in the computer system 10 of this illustrated embodiment is forty cycles (40τ), forty load commands including one or more prefetch commands are executed apart from the CPU 20 through a forty-stage issuing history queue 24a in the main storage request issuing section 24.

Specifically, as shown in FIG. 4, even if cache misses have occurred in succession, the main storage request corresponding to the leading cache miss will have been completed when the forty-first cache miss has occurred so that hardware of computer system 10 can be recycled. As a result, the CPU 20 can continue to process without halting due to the: cache-miss penalty.

Further, since the cache memories 13, 14 have an adequate number of read/write ports as mentioned above, the main pipeline of the CPU 20 can operate without encountering a conflict during prefetch operation; i.e. data is stored into the cache memories 13, 14 from the MSU 12.

Furthermore, in this embodiment, the illustrated issuing history queue 24a is a forty-stage queue provided so as to cope with a forty-cycle (40τ) cache-miss penalty. Practically, however, it is extremely rare that cache misses occurred in every cycle in the actual program. Therefore the issuing history queue 24a may be composed of less than forty stages, depending on the compromise between the behaviors of many programs and the costs of the hardware.

Thus in the computer system 10 of the illustrated embodiment, partly because the processing in the CPU 20 can be prevented from being halted, and partly because the hardware resource for storing into cache memories 13, 14 from the MSU 12 is not exhausted even when a multiplicity of prefetch commands are issued, it is possible to avoid any cache-miss penalty, reducing possible impairment over the main pipeline of the CPU 20 to a minimum.

The present invention should by no means be limited to the illustrated embodiment, and various other changes or modification may be suggested without departing from the gist of the inventive concept.

For example, in this embodiment, two cache memories are hierarchically arranged; alternatively more than two cache memories may be hierarchically arranged-with the same result.

Further, in this illustrated embodiment, the secondary cache memory 14 is disposed in the CPU 20; alternatively the secondary cache memory and subsequent cache memories may be disposed outside of the CPU 20.

What is claimed is:

1. A cache memory control apparatus for controlling a plurality of hierarchically arranged cache memories into which data of high-frequency of access is copied from a main storage unit by a processing unit of a computer system, which processing unit executes various processes using data stored in the main storage unit of the computer system, said apparatus comprising:

a command control section issuing a prefetch command to fetch speculative data, which is inclined to become necessary for near future use in the processing unit, from the main storage unit into the hierarchically arranged cache memories prior to execution of a corresponding process by the processing unit; and a prefetch control section controlling the hierarchically arranged cache memories, when the prefetch command issued by said command control section is executed, such that at least one of the hierarchically arranged cache memories to which said speculative data is to be fetched is changeably selected as one or more destination cache memories, according to at least either of status information about one of the hierarchically arranged cache memories and a kind of prefetch for the prefetch command.

2. The cache memory control apparatus according to claim 1, wherein the command control section further comprises:

a prefetch kind setting section setting kind-of-prefetch information about a kind of prefetch as a prefetch-destination change-over control condition for the prefetch command to be issued by said command control section, and a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section.

3. The cache memory control apparatus according to claim 1, wherein selection of a hierarchically arranged cache memory is based on state-of-use information about a storage area of the hierarchically arranged cache memory or state-of-contention information about the hierarchically arranged cache memory.

4. The cache memory control apparatus according to claim 1, wherein conflicts in the processing unit are substantially avoided.

5. The cache memory control apparatus according to claim 1, further comprising:

a status information detecting unit detecting status information about one of the cache memories disposed near the processing unit and outputting the detected status information to said prefetch control section so that said prefetch control section controls the cache memories so as to change-over said one or more destination cache memories in accordance with said detected status information.

6. The cache memory control apparatus according to claim 5, wherein selection of a hierarchically arranged cache memory is based on state-of-use information about a storage area of the hierarchically arranged cache memory or state-of-contention information about the hierarchically arranged cache memory.

7. The cache memory control apparatus according to claim 5, wherein conflicts in the processing unit are substantially avoided.

8. The cache memory control apparatus according to claim 5, wherein the command control section further comprises:

a prefetch kind setting section setting kind-of-prefetch information about a kind of prefetch as a prefetch-destination change-over control condition for the prefetch command to be issued by said command control section, and a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section.

9. The cache memory control apparatus according to claim 8, wherein selection of a hierarchically arranged cache memory is based on state-of-use information about a storage area of the hierarchically arranged cache memory or state-of-contention information about the hierarchically arranged cache memory.

10. The cache memory control apparatus according to claim 8, wherein conflicts in the processing unit are substantially avoided.

11. A computer system comprising:

a main storage unit;

a processing unit executing various processes using data stored in said main storage unit;

a plurality of hierarchically arranged cache memories to which data of high-frequency of access by said processing unit is to be fetched from said main storage unit; and a cache memory control apparatus controlling the plurality of cache memories and including a command control section issuing a prefetch command to fetch speculative data, which is inclined to become necessary for near future use in said processing unit, from said main storage unit into said hierarchically arranged cache memories prior to execution of a corresponding process by said processing unit, and a prefetch control section controlling said hierarchically arranged cache memories, when the prefetch command issued by said command control section is executed, such that at least one of said hierarchically arranged cache memories to which said speculative data is to be fetched is changeably selected as one or more destination cache memories, according to at least either of status information about one of the hierarchically arranged cache memories and a kind of prefetch for the prefetch command.

12. The computer system according to claim 11, further comprising:

a prefetch kind setting section setting kind-of-prefetch information about a kind of prefetch as a prefetch-destination change-over control condition for the prefetch command to be issued by said command control section; and a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section.

13. The cache memory control apparatus according to claim 11, wherein selection of a hierarchically arranged cache memory is based on state-of-use information about a storage area of the hierarchically arranged cache memory or state-of-contention information about the hierarchically arranged cache memory.

14. The cache memory control apparatus according to claim 11, wherein conflicts in the processing unit are substantially avoided.

15. The computer system according to claim 11, further comprising:
   a status information detecting unit detecting status information about one of the cache memories disposed near the processing unit and outputting the detected status information to said prefetch control section so that said prefetch control section controls the cache memories so as to change-over said one or more destination cache memories in accordance with said detected status information.

16. The cache memory control apparatus according to claim 15, wherein selection of a hierarchically arranged cache memory is based on state-of-use information about a storage area of the hierarchically arranged cache memory or state-of-contention information about the hierarchically arranged cache memory.

17. The cache memory control apparatus according to claim 15, wherein conflicts in the processing unit are substantially avoided.

18. The computer system according to claim 15, further comprising:
   a prefetch kind setting section setting kind-of-prefetch information about a kind of prefetch as a prefetch-destination change-over control condition for the prefetch command to be issued by said command control section; and
   a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section.

19. The cache memory control apparatus according to claim 18, wherein selection of a hierarchically arranged cache memory is based on state-of-use information about a storage area of the hierarchically arranged cache memory or state-of-contention information about the hierarchically arranged cache memory.

20. The cache memory control apparatus according to claim 18, wherein conflicts in the processing unit are substantially avoided.

21. A cache memory control apparatus for controlling a plurality of hierarchically arranged cache memories into which data of high-frequency of access is copied from a main storage unit by a processing unit of a computer system, which processing unit executes various processes using data stored in a main storage unit of the computer system, said apparatus comprising:
   a command control section issuing a prefetch command to fetch speculative data, which is inclined to become necessary for near future use in the processing unit, from the main storage unit into the hierarchically arranged cache memories prior to execution of a corresponding process by the processing unit;
   a prefetch control section controlling the hierarchically arranged cache memories, when the prefetch command issued by said command control section is executed, such that at least one of the hierarchically arranged cache memories to which said speculative data is to be fetched is changeably selected as one or more destination cache memories; and
   a status information detecting unit detecting status information about one of the cache memories disposed near the processing unit and outputting the detected status information to said prefetch control section so that said prefetch control section controls the cache memories so as to change-over said one or more destination cache memories in accordance with said detected status information.

22. The cache memory control apparatus according to claim 21, wherein the command control section further comprises:
   a prefetch kind setting section setting kind-of-prefetch information about a kind of prefetch as a prefetch-destination change-over control condition for the prefetch command to be issued by said command control section, and
   a prefetch kind identifying section identifying the kind of prefetch set for the prefetch. command to be issued and outputting a result of an identification of the kind of prefetch to said prefetch control section so that said prefetch control section controls a change-over of one or more destination cache memories based on the kind of prefetch received from said prefetch kind identifying section.

23. A cache memory control apparatus for controlling a plurality of hierarchically arranged cache memories into which data of high-frequency-of access is copied from a main storage unit by a processing unit of a computer system, which processing unit executes various processes using data stored in a main storage unit of the computer system, said apparatus comprising:
   a command control section issuing a prefetch command to fetch speculative data, which is inclined to become necessary for near future use in the processing unit, from the main storage unit into the hierarchically arranged cache memories prior to execution of a corresponding process by the processing unit, the command control section includes
      a prefetch kind setting section setting kind-of-prefetch information about a kind of prefetch as a prefetch-destination change-over control condition for the prefetch command to be issued by said command control section, and
      a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section; and
   a prefetch control section controlling the hierarchically arranged cache memories, when the prefetch command issued by said command control section is executed, such that at least one of the hierarchically arranged cache memories to which said speculative data is to be fetched is changeably selected as one or more destination cache memories.

24. A computer system comprising:

a main storage unit;

a processing unit executing various processes using data stored in said main storage unit;

a plurality of hierarchically arranged cache memories to which data of high-frequency of access by said processing unit is to be fetched from said main storage unit;

a cache memory control apparatus controlling the plurality of cache memories and including a command control section issuing a prefetch command to fetch speculative data, which is inclined to become necessary for near future use in said processing unit, from said main storage unit into the hierarchically arranged cache memories prior to execution of a corresponding process by said processing unit, and a prefetch control section controlling the hierarchically arranged cache memories, when the prefetch command issued by said command control section is executed, such that at least one of the hierarchically arranged cache memories to which said speculative data is to be fetched is changeably selected as one or more destination cache memories; and a status information detecting unit detecting status information about one of the cache memories disposed near the processing unit and outputting the detected status information to said prefetch control section so that said prefetch control section controls the cache memories so as to change-over said one or more destination cache memories in accordance with said detected status information.

25. A computer system according to claim 24, wherein the command control section further comprises:

a prefetch kind setting section setting kind-of-prefetch information about a kind of prefetch as a prefetch-destination change-over control condition for the prefetch command to be issued by said command control section, and a prefetch kind identifying section identifying the kind of prefetch set for the prefetch command to be issued and outputting a result of an identification of the kind of. prefetch to said prefetch control section so that said prefetch control section controls a change-over of one or more destination cache memories based on the kind of prefetch received from said prefetch kind identifying section.

26. A computer system comprising:

a main storage unit;

a processing unit executing various processes using data stored in said main storage unit;

a plurality of hierarchically arranged cache memories to which data of high-frequency of access by said processing unit is to be fetched from said main storage unit; and a cache memory control apparatus controlling the plurality of cache memories and including a command control section issuing a prefetch command to fetch speculative data, which is inclined to become necessary for near future use in said processing unit, from said main storage unit into the hierarchically arranged cache memories prior to execution of a corresponding process by said processing unit, and a prefetch control section controlling the hierarchically arranged cache memories, when the prefetch command issued by said command control section is executed, such that at least one of the hierarchically arranged cache memories to which said speculative data is to be fetched is changeably selected as one or more destination cache memories;

a prefetch kind setting section setting kind-of-prefetch information about a kind of prefetch as a prefetch-destination change-over control condition for the prefetch command to be issued by said command control section; and a prefetch kind identifying section identifying the kind of prefetch set for the prefetch command to be issued and outputting a result of an identification of the kind of prefetch to said prefetch control section so that said prefetch control section controls a change-over of one or more destination cache memories based on the kind of prefetch received from said prefetch kind identifying section.

* * * * *